United States Patent
Hu et al.

(10) Patent No.: US 8,428,017 B2
(45) Date of Patent: Apr. 23, 2013

(54) CHANNEL QUALITY REPORTING METHOD AND ARRANGEMENT IN A TELECOMMUNICATION SYSTEM

(75) Inventors: Rong Hu, Sollentuna (SE); Dirk Gerstenberger, Stockholm (SE); Muhammad Kazmi, Bromma (SE); Claes Tidestav, Bålsta (SE); Hai Wang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/520,583

(22) PCT Filed: Dec. 17, 2007

(86) PCT No.: PCT/EP2007/011064
§ 371 (c)(1),
(2), (4) Date: Jan. 13, 2010

(87) PCT Pub. No.: WO2008/077524
PCT Pub. Date: Jul. 3, 2008

(65) Prior Publication Data
US 2010/0135169 A1      Jun. 3, 2010

(30) Foreign Application Priority Data
Dec. 22, 2006   (SE) ...................................... 0602803

(51) Int. Cl.
*H04L 12/56*   (2006.01)
(52) U.S. Cl.
USPC ........... 370/329; 370/333; 370/236; 370/332; 370/252; 455/436

(58) Field of Classification Search ........................ None
See application file for complete search history.

(56) References Cited

U.S. PATENT DOCUMENTS

| | | | |
|---|---|---|---|
| 6,292,518 B1 * | 9/2001 | Grabb et al. .................. | 375/321 |
| 2003/0092461 A1 * | 5/2003 | Moulsley et al. ............. | 455/522 |

(Continued)

FOREIGN PATENT DOCUMENTS

| | | |
|---|---|---|
| EP | 1569492 A | 8/2005 |
| WO | 2006116704 A | 11/2006 |
| WO | 2006118304 A | 11/2006 |

OTHER PUBLICATIONS

International Search Report for PCT/EP2007/011064 mailed Jun. 16, 2008.

(Continued)

*Primary Examiner* — Kibrom T Hailu
*Assistant Examiner* — Zewdu A Beyen
(74) *Attorney, Agent, or Firm* — Potomac Patent Group PLLC (57) ABSTRACT

When a high SIR can be achieved for downlink data transmission, for example in a MIMO system, or when higher order modulation, such as 64 QAM, can be used, it is desired to measure the instantaneous downlink channel quality indicator (CQI), and report the measured CQI to the network using the same number of bits as when a lower SIR can be achieved. In order to do this, a true CQI is derived based upon at least one network controlled parameter and a measured channel quality parameter; and the true CQI value is scaled to a new CQI value such that the new CQI will fall within a specified range of CQI values; so that the new CQI achieved by scaling the derived CQI value can be reported with every CQI value over the entire reporting range requiring the same number of bits.

16 Claims, 5 Drawing Sheets

U.S. PATENT DOCUMENTS

| | | | |
|---|---|---|---|
| 2005/0153726 A1 | 7/2005 | Takano | |
| 2005/0282500 A1 | 12/2005 | Wang et al. | |
| 2006/0209970 A1* | 9/2006 | Kanterakis | 375/259 |
| 2006/0293008 A1* | 12/2006 | Hiraki et al. | 455/226.4 |
| 2008/0062920 A1* | 3/2008 | Pi et al. | 370/329 |

OTHER PUBLICATIONS

TSG-RAN-W1 HSDPA, 3GPP R1-2-0675, "Revised CQI Proposal," Motorola, Ericsson, Paris, France, Apr. 9-12, 2002, pp. 1-8.

3GPP TR 25.814 v7.1.0, "3rd Generation Partnership Project; Technical Specification Group Radio Access Network; Physical layer aspects for evolved Universal Terrestrial Radio Access (UTRA) (Release 7)," Technical Report, Sep. 2006, pp. 1-132.

3GPP TS 25.214 v5.11.0, "3rd Generation Partnership Project; Technical Specification Group Radio Access Network; Physical layer procedures (FDD) (Release 5)," Technical Specification, Jun. 2005, pp. 1-51.

International Preliminary Report on Patentability for PCT/EP2007/011064 mailed May 11, 2009.

Japanese Office Action issued in corresponding Japanese Patent Application No. 2009-541859, mailing date Oct. 19, 2012.

Motorola, "E-UTRA Uplink L1/L2 Control Channel Mapping," [online], 3GPP TSG-RAN WG1#46b, R1-062626, Internet, <URL:http://www.3gpp.org/ftp/tsg_ran//WG1_RL1/TSGR1_46bis/Docs/R1-062626.zip>, Meeting #46,Seoul, Korea, Oct. 9-13, 2006.

NTT DoCoMo, Ericsson, "Text Proposals on LTE Physical Layer Description for TR 25.912, Chapter 7, " [online], 3GPP TSG-RAN WG1#45 R1-061111, Internet, <URL:http://www.3gpp.org/tsg_ran/WG1_RL1/TSGR_45/Docs/R1-06111.zip>, Meeting #45, Shanghai, China, May 8-12, 2006.

* cited by examiner

Figure 5

CHANNEL QUALITY REPORTING METHOD AND ARRANGEMENT IN A TELECOMMUNICATION SYSTEM

RELATED APPLICATIONS

This application claims priority and benefit from International Application No. PCT/EP2007/011064, filed Dec. 17, 2007, which claims priority to Swedish patent application No. 0602803-9, filed Dec. 22, 2006, the entire teachings of which are incorporated herein by reference.

FIELD OF THE INVENTION

The present invention relates to reporting of Channel Quality Indicator (CQI) in a packet-based wireless telecommunication network.

BACKGROUND

In 3GPP Release 5, High-Speed Downlink Packet Access (HSDPA) is introduced, where a new modulation scheme (16 QAM) is introduced in addition to the existing QPSK (Quadrature Phase Shift Keying) modulation scheme in Release 99.

In HSDPA systems, the UE (User Equipment) reports the Channel Quality Indicator (CQI) through uplink HS-DPCCH (High Speed Downlink Physical Control Channel) to the RBS (Radio Base station), for which a single HS-PDSCH (High Speed Physical Downlink Shared Channel) sub-frame formatted with the transport block size, number of HS-PDSCH codes and modulation corresponding to the reported or lower CQI value could be received, and for which the transport block error probability would not exceed 10%, see 3GPP TS 25.214, v 5.11.0, "Physical layer procedures (FDD)".

In 3GPP Release 5, five bits are used to report the CQI, resulting in a CQI value range of [0, 31], where there is a one decibel resolution, see 3GPP TS 25.212 v6.9.0, "Multiplexing and channel coding (FDD)". Among these CQI values, a CQI value of "0" is specified to be "out of range", which means that no transport block can be selected due to bad channel quality; a CQI value of 31 is not explicitly specified but in one Ericsson contribution, 3GPP R1-02-0675, Ericsson, Motorola, "Revised CQI proposal", Paris, France, Apr. 9~12, 2002, the CQI value of "31" is stated to be reserved.

For the purpose of CQI reporting, the UE shall assume a total received HS-PDSCH power as $$P_{HSPDSCH} = P_{CPICH} + \Gamma + \Delta \text{ in dB} \quad (1)$$

where the total received power is evenly distributed among the HS-PDSCH codes of the reported CQI value, the measurement power offset is signaled by higher layers and the reference power adjustment $\Delta$ depends on the UE category, see 3GPP TS 25.214, v 5.11.0, "Physical layer procedures (FDD)". The power offset $\Gamma$ is defined as the transmit power of HS-PDSCH divided by the transmit power of CPICH (Common Pilot Channel) in the linear scale; or on the dB scale: $\Gamma$=transmit power of HS-PDSCH—transmit power of CPICH.

$\Gamma$ can preferably be set as a configurable parameter and can be configured by operators.

Therefore, UEs actually assume that $$SIR_{HS-PDSCH} = SIR_{CPICH} + \Gamma + \Delta \text{ in dB} \quad (2)$$

The mapping between the HS-PDSCH SIR (signal to interference ratio) and CQI behind the current 3GPP design is that $$CQI = 4.5 + SIR_{HS-PDSCH} \text{ in dB} \quad (3)$$

where SIR means the total HS-DSCH SIR, summed over the number of HS-PDSCH codes, see 3GPP R1-02-0675, Ericsson, Motorola, "Revised CQI proposal", Paris France, Apr. 9~12, 2002.

According to equation (3) above and taking the CQI range [0, 30] into account, the reportable $SIR_{HS-PDSCH}$ value in the dB scale is calculated and has a range of [−4.5, 25.5] dB. Any SIR value smaller than −4.5 dB is reported as a CQI value of "0" and SIR values greater than 26.5 dB are reported as a CQI value of "30". Thus, it is important to note that the factor of 4.5 in equation (3) is not a scaling factor. Rather, it is an offset added to the SIR such that the CQI is reported in a range that starts at 0 and not −4.5.

3GPP TSG RAN has approved the SI description on "Scope of future FDD HSPA Evolution". One way to achieve higher peak data rates is to introduce higher-order modulation (64QAM/16QAM) for HSDPA/HSUPA (High Speed Downlink Packet Access/High Speed Uplink Packet Access). However, the 64QAM (Quadrature Amplitude Modulation) modulation scheme normally requires a very good channel quality, e.g. above 25 dB $SIR_{HS-PDSCH}$ if 15 codes are available, see FIGS. 1a and 1b.

Figure 1A:
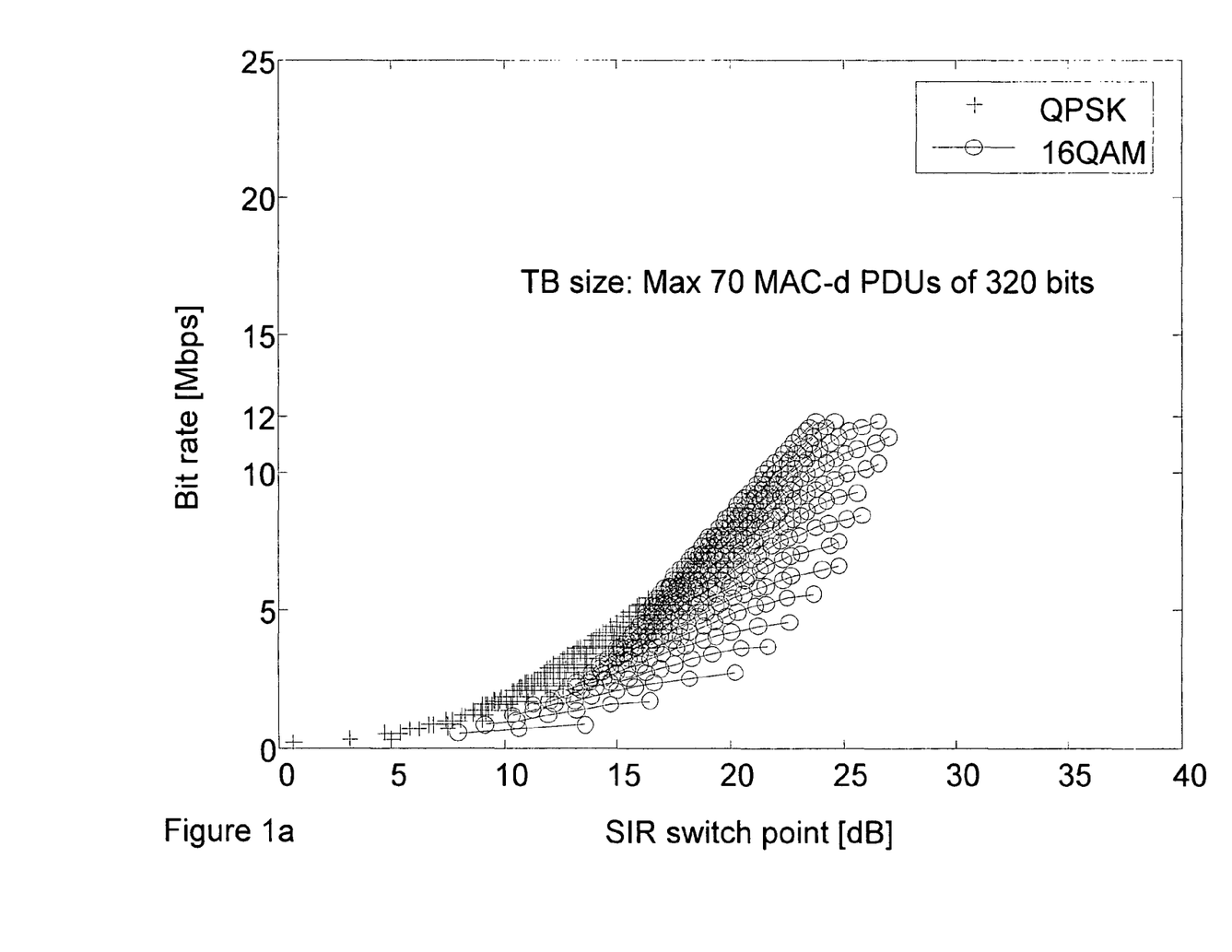
FIGS. 1a and 1b illustrate bit rate vs. SIR switch point, where different modulation schemes are indicated in the figure and from bottom to top there are 15 dotted lines representing the number of channelization codes from 1 code to 15 codes.

FIG. 1a is a graph showing bit rate versus SIR switch point, for QPSK towards the left of the graph and 16QAM towards the right of the graph (i.e. higher SIR switch point). Also shown on the graph are 15 variations showing the effect of changing the number of channelization codes from 1 (at the bottom, i.e. relatively low bit rate) to 15 (at the top, i.e. relatively high bit rate).

Figure 1B:
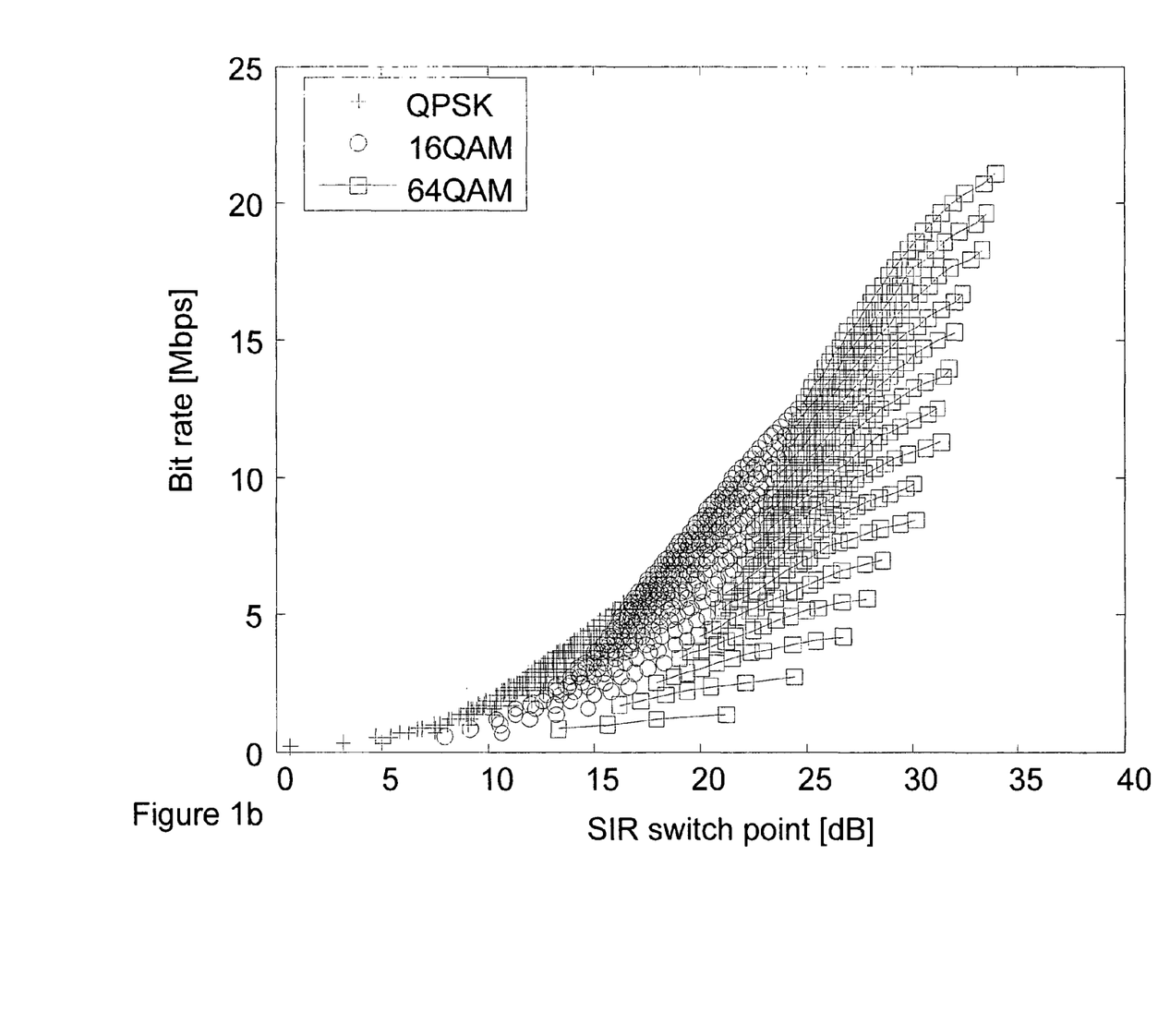

FIG. 1b is the same graph as shown in FIG. 1a, but with the plots extended to show 64QAM on the right- and uppermost portion side of the graph (i.e. highest SIR switch point and highest bit rate).

As described in the foregoing, in Release 5, SIR values greater than 25.5 dB will be reported as a CQI value of 30. From FIG. 1b, it can be seen that after introducing 64QAM, obviously these high SIR values can't simply be reported as a CQI value of "30". Otherwise, some large TBs (Transport Blocks) cannot be selected and the peak rate (~22 Mbps) cannot be reached.

SUMMARY

This invention disclosure proposes solutions for CQI reporting after the new modulation scheme (64QAM) is introduced into 3GPP. These solutions take both the CQI signaling cost and the need of 3GPP specification change into account.

According to one aspect, the present invention relates to a method in a user equipment for measuring the instantaneous downlink channel quality indicator (CQI), and reporting the measured CQI to the network when higher order modulation, such as 64 QAM, can be used for downlink data transmission. The method comprises the steps of:
  deriving a true CQI based upon at least one network controlled parameter and a measured channel quality parameter;
  scaling said true CQI value to a new CQI value such that the new CQI will fall within a specified range of CQI values;
  reporting the new CQI achieved by scaling the derived CQI value in order to report every CQI value with the same number of bits over the entire reporting range.

According to a preferred embodiment, the invention is applied in an HSDPA CDMA system. However, the invention is also applicable to other systems such as E-UTRAN in LTE.

According to another aspect, the invention relates to a method in a base station of receiving the downlink channel quality indicator (CQI) from the user equipment and using the received CQI for transmitting data and if necessary using higher order modulation such as 64 QAM, comprising
  interpreting the reported CQI according to a scaling applied by the user equipment on the derived true CQI.

According to yet another aspect, the invention relates to a method in a base station of receiving downlink channel quality indicator (CQI) from a user equipment and using the received CQI to be able to transmit data and if necessary using higher order modulation such as 64 QAM. The method comprises:
  collecting the statistics of the received CQI reports and based on the statistics reporting an event to the radio network controller in case the CQI statistics indicate significant change in the downlink channel quality.

According to a preferred embodiment, the received CQI is used for transmitting data on HS-PDSCH in a CDMA (Code Division Multiple Access) system.

According to yet another aspect, the invention relates to a method in a radio network controller of configuring a user equipment with parameters to assist the user equipment in deriving CQI. Said method comprises:
  configuring the user equipment with at least two different power offset values to be used by the user equipment to derive the CQI and in addition if necessary also,
  configuring the user equipment with a threshold value ($\mu$) to trigger which power offset value to be used by the user equipment.

Preferably, the larger power offset is configured to be used by the user equipment to report the CQI when the derived CQI is less than the specified threshold or the configured threshold ($\mu$), otherwise the smaller power offset is configured to be used by the user equipment to report the CQI.

According to yet another aspect, the invention relates to a method in a radio network controller of receiving the downlink channel quality measurements and signaling to the base station the configured power offset, which is currently used by the user equipment to derive the CQI and report the derived CQI to the base station. The method comprises
  configuring an event at the base station to indicate significant change in CQI statistics.
  receiving and interpreting the event reported by the base station.
  reconfiguring the power offset at the user equipment if necessary.
  signaling the reconfigured power offset to the base station if the reconfiguration was done at the user equipment.

The foregoing and other objects, features and advantages of the invention will be apparent from the following detailed description of preferred embodiments

DETAILED DESCRIPTION

Figure 2:
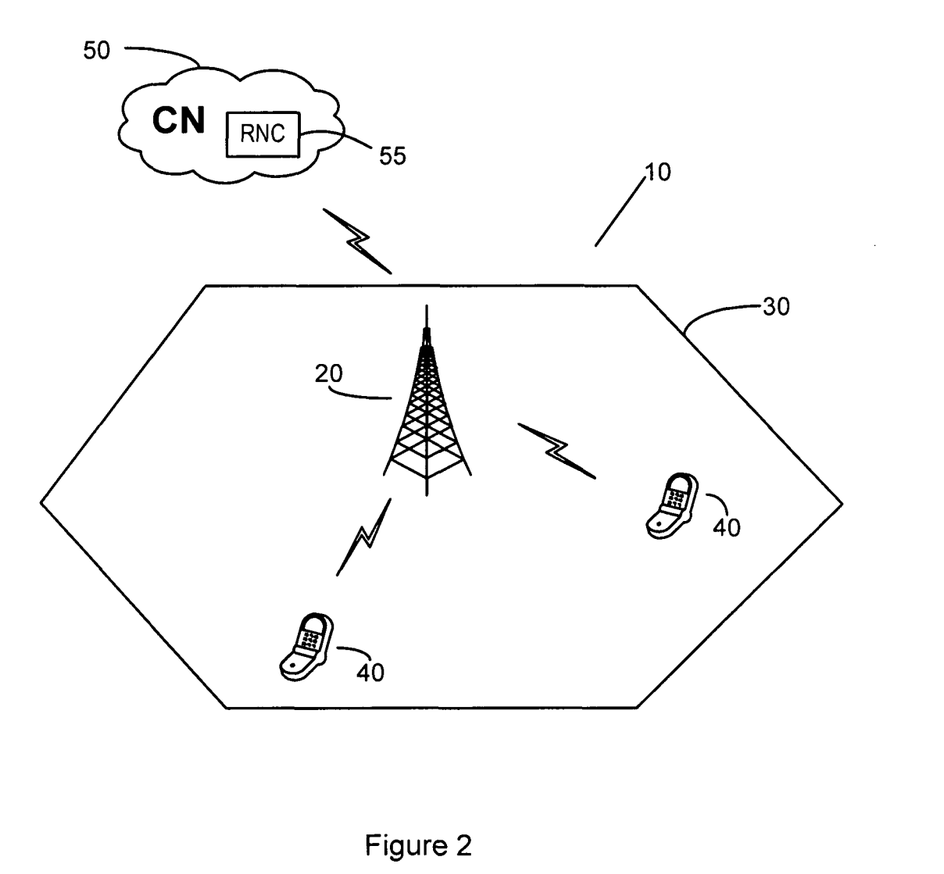
FIG. 2 illustrates part of a wireless telecommunications network according to the present invention.

FIG. 2 illustrates part of a wireless telecommunications network 10 according to the present invention.

The telecommunications network 10 comprises at least one radio base station 20 (alternatively called a network node, node B, or any other name familiar to those skilled in the art). The transmission area 30 of the radio base station 20 is shown as a hexagon surrounding the base station; this transmission area 30 is commonly referred to as a cell. Only one base station and its associated cell are shown for convenience; it will be appreciated that the network 10 will typically comprise many such base stations and cells. Cellular phones 40 (also referred to as user equipments) within the cell 30 receive transmissions from the base station 20 on one or more carriers, and send their own transmissions back to the base station 20. A core network (CN) 50, in communication with the base station 20, controls overall operation of the network 10. The core network 50 comprises, amongst other things, a radio network controller (RNC) 55.

Those skilled in the art will appreciate that many elements of the network 10 have been omitted for clarity. The operation of the base station 20 and the user equipments 40, in particular, is described in further detail below.

A straightforward solution to the described problem is to extend the current 5-bit CQI to be a 6-bit CQI, which results in a new CQI range of [0, 63].

This is a simple way and can use the same mapping between CQI and SIR as in 3GPP Release 5. On the other hand, the CQI cost in terms of signaling bits is increased due to one additional bit for each CQI reporting, particularly in the MIMO (Multiple Input Multiple Output) case where there may be three CQIs needed for each reporting. Among them, two CQIs will be used for two streams while the third one is used for a conventional single stream. In addition, the extended CQI range of [40, 60] will actually not make much sense since the highest required $SIR_{HS\text{-}PDSCH}$ for the max TB with 15 channelization codes and 64QAM is just about 34 dB. Therefore, this one additional bit extension of CQI is actually not fully efficiently utilized.

According to an alternative solution, a scaling factor is used in the derived CQI values to keep the current reporting range of [0, 30], and the UE reports the scaled CQI to RBS. This solution will be described in the following three steps:

Step 1: UE derives the true CQI in the same way as in Release 5, i.e.

$$CQI_{true}=4.5+SIR_{HS\text{-}PDSCH} \text{ in dB} \quad (4)$$

Step 2: UE then applies a scaling factor to the true CQI as calculated in equation (4)

$$CQI_{reported}=\text{factor}\times(4.5+SIR_{HS\text{-}PDSCH}) \text{ in dB} \quad (5)$$

For example, a factor of ¾ can be used to keep $CQI_{reported}$ in the range of [0, 30], which results in the reported $SIR_{HS\text{-}PDSCH}$ range of [−4.5, 35.5] dB, which is enough for the case of 15 channelization codes with 64QAM, where the peak rate of ~22 Mbps can be reached. The RBS can derive the true CQI as $CQI_{reported}\times 4/3$.

According to the rule shown in equation (5), a new CQI table for 64 QAM UEs could be specified.

As a further implementation of this solution, the mapping in a new CQI table can be constructed with a non-constant factor, i.e.

$$CQI_{reported}=f(SIR_{HS\text{-}PDSCH})\times(4.5+SIR_{HS\text{-}PDSCH}) \text{ in dB} \quad (5a),$$

where $f(SIR_{HS\text{-}PDSCH})$ is a scaling factor that is a function of the estimated SIR on the HS-PDSCH.

Alternatively, said non-constant scaling factor can be a function of the estimated SIR on common pilot symbols, i.e.

$$CQI_{reported}=f(SIR_{CPICH})\times(4.5+SIR_{HS\text{-}PDSCH}) \text{ in dB} \quad (5b)$$

According to one embodiment, the UE derives the scaling factor based on the estimated SIR ($SIR_{HS\text{-}PDSCH}$ or $SIR_{CPICH}$) in a way that the derived CQI fits into one of the reportable values, e.g. 26, 27, . . . , 30. As shown in FIG. 1 the bit rate is a non-linear function of the measured SIR (i.e. $SIR_{HS\text{-}PDSCH}$). The reported CQI corresponds to a certain transport block (or data block) size that the network uses to schedule packets in the downlink. Therefore, the scaling factor, which may be a positive quantity in the linear scale, may also be a non-linear function of SIR.

Figure 3:
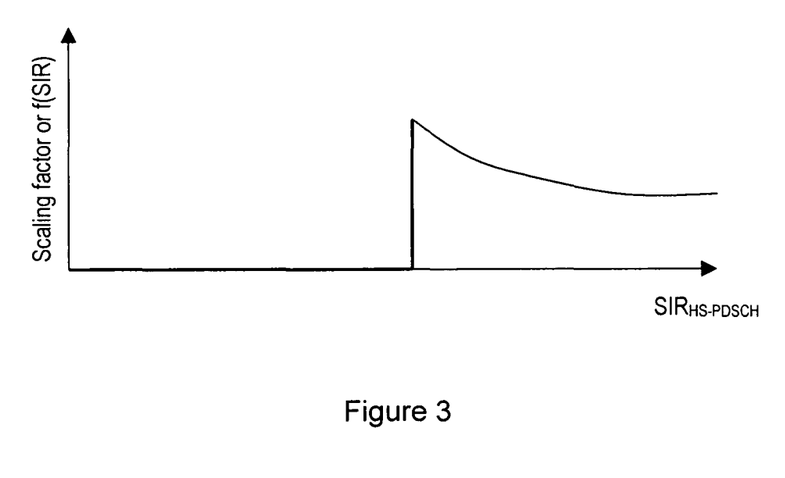
FIG. 3 illustrates a change in scaling factor with variation in SIR.

FIG. 3 shows one example of the scaling factor as a function of $SIR_{HS\text{-}PDSCH}$ in the linear scale.

More scaling may be needed at higher SIR and less scaling at lower SIR, as shown in FIG. 3. For example, below some threshold SIR value $SIR_0$ no scaling is required, while above that value scaling is performed. This situation occurs when higher order modulation is used (for example, 64 QAM, MIMO, etc), where higher SIRs are achievable.

As mentioned above, another scenario where UE receives signals with high SIR is multiple input multiple output (MIMO) systems, e.g. 2×2 (2 transmit and 2 receive antennae) or 4×2 (4 transmit and 2 receive antennae). Yet another example where very high SIR is achievable is a combination of higher order modulation with MIMO systems. The present invention is therefore applicable in all these scenarios since through scaling the UE could report the CQI without the need of any extra bits, as compared to the normal scenario which use lower order modulation and non MIMO systems (e.g. 1×1 or 1×2 transmit/receive antennae cases).

This solution does not increase the CQI cost in terms of CQI bits or other signaling overheads. This solution only requires that the UE and RBS need to use a common rule to derive CQIs.

Step 3: UE reports the $CQI_{reported}$ to the RBS.

Figure 4:
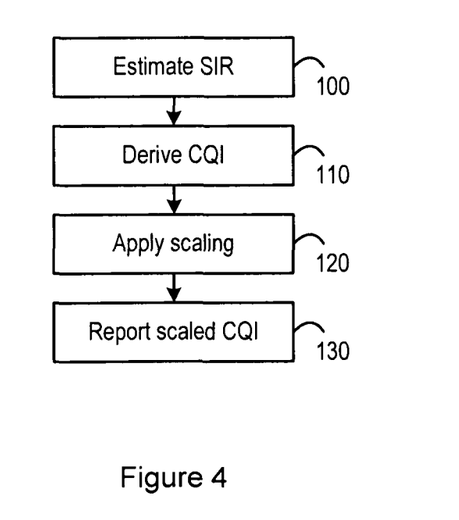
FIG. 4 is a flow chart illustrating a method in accordance with an aspect of the invention.

FIG. 4 is a flow chart illustrating this method in more detail.

Flow begins in step 100, where the UE estimates the SIR. As previously mentioned, in a CDMA system this may be on the HS-PDSCH or on common pilot channels (CPICH); in an LTE E-UTRAN system, this may be on downlink shared channel (DL-SCH) or downlink reference channels. Other examples may be thought of by those skilled in the art.

In step 110, the CQI is derived from the estimated SIR as in Release 5 (i.e. by adding a network controlled parameter to the estimated SIR; the network controlled parameter will typically take the value of 4.5).

In step 120, the derived CQI is multiplied by a factor to generate a scaled CQI. As discussed above, the factor may be constant or variable, and may be a function of the SIR estimated in step 100.

In step 130, the scaled CQI is reported to the network.

In the following, yet an alternative solution is proposed, comprising an adaptive/event triggered adjustment of CQI. As described in equation (2), $$SIR_{HS\text{-}PDSCH} = SIR_{SPICH} + \Gamma + \Delta \text{ in dB}$$

An adaptive/event triggered power offset $\Gamma$ adjustment can make the reported CQI falling in the range of [0, 30]. In 3GPP, $\Gamma$ is one information element (IE) in the RRC message. The $\Gamma$ range is [−6, 13] and the resolution is 0.5 dB. It will be sent to the UE together with other IEs (CQI feedback cycle k, CQI repetition factor, delta CQI). Currently, this RRC message is typically only transmitted once per connection. However, nothing prevents $\Gamma$ from being updated during the duration of a connection. Of course, to minimize the RRC signaling, the number of updates should be kept to a minimum. Fortunately, it is reasonable to assume that a single UE does not need the entire dynamic range of CQI reports: the CQI reports from one single UE almost never cover the entire reporting range.

There are three ways in which $\Gamma$ can be adjusted adaptively or in an event triggered fashion:
 Based on CQI statistics in the base station
 Based on downlink measurements available in the RNC (radio network controller)
 Pre-configuration of two power offset values
The alternatives will be described in the following.

Based on CQI Statistics in the Base Station

Ideally, the update of $\Gamma$ should be based on CQI statistics. Unfortunately, such statistics are not available in the RNC. To improve the performance of the solution, a new message on the Iub interface between the base station and the RNC requesting the RNC to update the $\Gamma$ may be standardized. Thus, the base station would estimate the mean of the CQI reports for a few hundred milliseconds, and then request that the RNC updates the $\Gamma$ to make the CQI mean equal to 15.

An embodiment of the invention comprises a method in a base station of receiving downlink channel quality indicator (CQI) from a user equipment, said CQI being derived by using a power offset value configured by a radio network controller, and using the received CQI to be able to transmit data and if necessary using higher order modulation, characterized by:
 collecting the statistics of the received CQI reports and based on the statistics reporting an event to the radio network controller in case the CQI statistics indicate significant change in the downlink channel quality, to be used by the radio network controller for adjusting the power offset value;
 receiving any reconfigured power offset from the radio network controller.

The received CQI may be used for transmitting data on HS-PDSCH in a CDMA system.

The higher order modulation may be 64 QAM.

Said embodiment furthermore comprises a radio base station for communicating with a plurality of user equipments, and having means for connection to a radio network controller of a wireless telecommunications network, wherein the radio base station is configured to receive a downlink channel quality indicator from a user equipment, by means of the method described in the foregoing.

Another embodiment of the invention comprises a method in a radio network controller of receiving the downlink channel quality measurements and signaling to the base station a configured power offset, which is used by the user equipment to derive the CQI and report the derived CQI to the base station, characterized by the steps of
 configuring an event at the base station to indicate significant change in CQI statistics.
 receiving and interpreting the event reported by the base station.
 reconfiguring the power offset at the user equipment if necessary.
 signaling the reconfigured power offset to the base station if the reconfiguration was done at the user equipment.

Said embodiment furthermore comprises a radio network controller for communicating with a radio base station of a wireless telecommunications network, the radio network controller being configured to receive the downlink channel quality measurements and signal to the base station by means of the method described in the foregoing.

Based on Downlink Measurements Available in RNC

In this adaptive $\Gamma$ solution, an initial $\Gamma$ is transmitted to the UE during the connection set-up. Based on measurements readily available in the RNC, a new $\Gamma$ is sent to the UE using measurements collected during a few 100 ms. The RNC may base this update on measurements of e.g., throughput or Ec/Io (the ratio between received signal power to total received interference). Thus, if the throughput indicates that the UE has excellent quality, the RNC reduces the Γ by some quantity.

Pre-Configuration of Two Power Offset Values

Another possibility is that the network configures at the UE more than one power offset value (Γ), for example two values ($\Gamma_1, \Gamma_2$), where $\Gamma_1 > \Gamma_2$. The UE initially derives the CQI using the first power offset value ($\Gamma_1$). In the case that the derived CQI value is below a certain threshold (μ) then the UE shall report the same derived CQI. On the other hand, in the case that the derived CQI using $\Gamma_1$ exceeds the threshold (μ), the UE re-derives the CQI value using the second power offset value ($\Gamma_2$) and reports the CQI using $\Gamma_2$. The threshold value (μ) can either be standardized (e.g. CQI=25) or it can be set by the network in an event triggered fashion. The second approach is more flexible. The solution may also require RRC signaling support for reporting more than one power offset value (for example two values) to the UE.

In the following, yet another possible solution is proposed. According to this solution the CQI cost is kept, i.e., still 5 bits, but the mapping rule is changed when the UE estimates a higher HS-PDSCH SIR value than 25.5 dB, which results in a CQI greater than 30. More specifically, the CQI value of "31" may be used to indicate a change of CQI mapping since this value is reserved in current Release 5. This is done by adding an offset value to the reported CQI values as will be described below.

If the derived CQI value at the UE is greater than 30, the UE reports a CQI value of 31 in the current TTI (Transmission Time Interval) with a high power, notifying the RBS that the following reported CQI values are actually greater than 30 and that an offset value of 30 shall be added to the reported CQI; e.g. the reported CQI "1" actually means a CQI of 1+30; the reported CQI "2" actually means a CQI of 2+30.

If the derived CQI value at the UE is smaller than 30 and the derived CQI for the previous TTI is greater than 30, the UE reports a CQI value of 31 in the current TTI with a high power, notifying the RBS that the following reported CQI values are actually the derived CQI values, i.e. without the addition of an offset value; e.g. the reported CQI "1" actually means a CQI value of 1; the reported CQI "2" actually means a CQI value of 2.

If none of the two cases above are applicable, the UE reports the actual CQI as usual as in Release 5.

Figure 5:
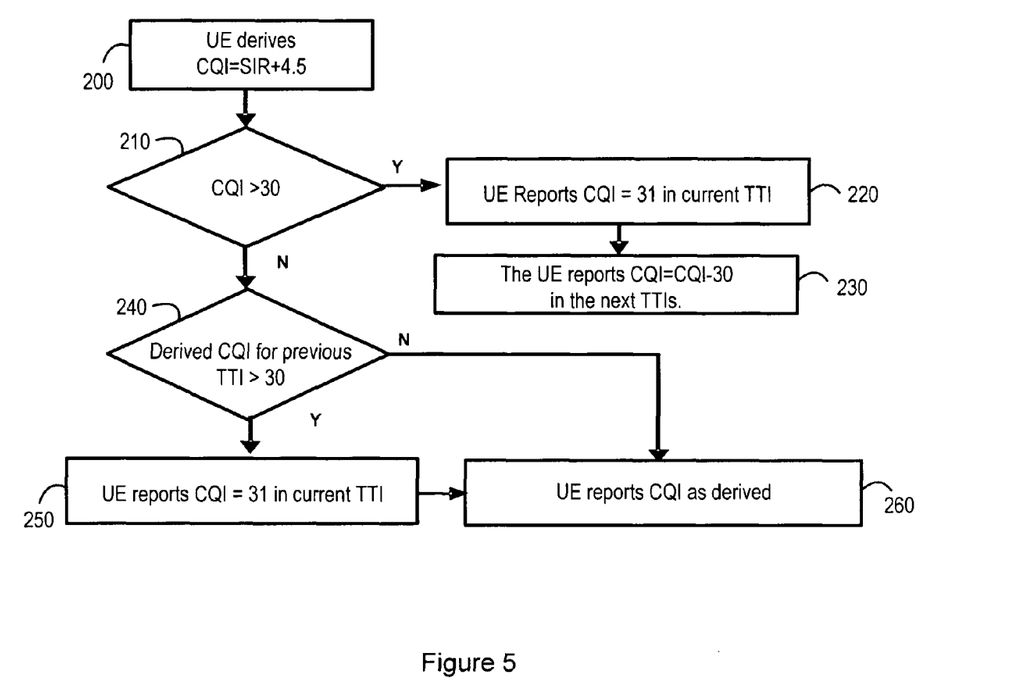
FIG. 5 is a flow chart illustrating a further method in accordance with an aspect of the invention.

FIG. 5 is a flow chart illustrating a specific embodiment of this method in detail.

Flow begins in step 200, that of deriving the CQI. This is achieved as described previously (i.e. by estimating the SIR, and then adding a network controlled parameter, typically 4.5).

In step 210, the UE determines whether the derived CQI is greater than 30. If the CQI is greater than 30, flow proceeds to step 220, where the UE reports a CQI value of 31 to the network. The "31" value is reserved, and indicates a shift of the mapping rules, such that subsequent reported CQI values are calculated by subtracting 30 from the derived CQI value (step 230). That is, the network now understands that subsequent reported CQI values will be in the range 31-60.

In step 210, if the CQI is less than or equal to 30, the UE determines whether the preceding derived CQI was greater than 30 (step 240). If it was, flow proceeds to step 250, where the UE reports a value of 31, shifting the mapping rules back so that the network understands that subsequent reported CQI values will be in the range 1-30. In step 260, the UE reports the CQI as derived.

In step 240, if the preceding CQI value was not greater than 30, there is no need to shift the mapping rules, and so the flow can proceed directly to step 260.

This solution does not increase the CQI cost in terms of the number of CQI bits. However, in this solution, the RBS may need to have the change history of CQI. That is, the history of the CQI and whether it is above or below 30. This solution is therefore more suitable for a system with a relatively flat radio quality, and less suitable for large fluctuations where radio quality changes more frequently (e.g., TTI 1:25 dB, TTI 2:38 dB, TTI 3:20 dB). However, the system works adequately in both scenarios.

This solution might be extended to use a CQI of 31 together with a CQI of 0 to indicate the change of CQI mapping, which can improve the reliability of this indicator. In other words, the unique CQI sequence [31 0] may be used to indicate the change of CQI mapping.

Thus, an embodiment of the invention comprises a method in a radio network controller of configuring a user equipment with parameters to assist the user equipment in deriving CQI, characterized by,
configuring the user equipment with at least two different power offset values to be used by the user equipment to derive the CQI and in addition if necessary also,
configuring the user equipment with a threshold value (μ) to trigger which power offset value to be used by the user equipment.

The larger power offset may be configured to be used by the user equipment to report the CQI when the derived CQI is less than the specified threshold or the configured threshold (μ), otherwise the smaller power offset is configured to be used by the user equipment to report the CQI.

Said embodiment furthermore comprises a radio network controller for communicating through a radio base station of a wireless telecommunications network with at least one user equipment, the radio network controller being configured to configure the user equipment by means of the method as described in the foregoing.

Said embodiment furthermore comprises a method in a wireless telecommunications network, for measuring an instantaneous downlink channel quality indicator (CQI) and reporting the measured CQI to the network, characterized by the steps of:
in a user equipment, measuring a channel quality parameter;
in the user equipment, deriving a first CQI value on the basis of the measured channel quality parameter and at least a first offset;
in the user equipment, updating said first offset;
in the user equipment, deriving a second CQI value on the basis of the measured channel quality parameter and said updated first offset, such that the second CQI value falls within a specified range of CQI values; and
in the user equipment, reporting said second CQI value to the network.

The measured channel quality parameter may be a signal-to-interference ratio (SIR).

The first CQI value may comprise a first number of bits and the specified range of CQI values corresponds to a second number of bits, the first number of bits being greater than the second number of bits.

Said updating step may comprise the step of in the user equipment, selecting one of a plurality of preset first offset values.

Said updating step may further comprise the step of:
in the user equipment, comparing said first CQI value with a threshold value;
wherein said selecting step is based on the result of said comparison.

Said embodiment furthermore comprises a user equipment, for communicating with a radio base station in a wireless telecommunications network, wherein the user equipment is configured to measure the instantaneous downlink channel quality indicator, and report the measured channel quality indicator to the network, by means of the method described in the foregoing.

The invention has in the foregoing been described with reference to HSDPA systems. However, the invention is also applicable to CQI Reporting in E-UTRAN (Evolved UMTS Terrestrial Radio Access Network), as will be described in the following.

The E-UTRAN system is purely packet oriented. This means the downlink scheduling and link adaptation are highly dependent upon the CQI reports from the UE, see 3GPP TR 25.814, "Physical Layer Aspects for Evolved UTRA". In E-UTRAN higher order modulation (e.g. 64 QAM) is likely to be used. This means the CQI may also require more than 5 bits due to higher order modulation. In E-UTRAN the CQI in principle can be reported for each resource block. A resource block is a two-dimensional time-frequency resource. The E-UTRAN bandwidth contains several resource blocks and the actual number depends upon the cell bandwidth. This means there will be considerable signaling overheads in E-UTRAN. Therefore there is strong motivation to reduce the signaling overheads in E-UTRAN especially when higher order modulation is used in the downlink.

The solutions relating to scaling of true CQI values, adaptive/event triggered $\Gamma$ adjustment and change of the CQI mapping rule described in the foregoing are equally applicable to the CQI reporting in E-UTRAN. The exact definition of CQI in E-UTRAN may be different; however, it is likely to be a function of some network controlled parameter and the measured SIR on some known reference symbols. Hence, the idea of scaling the derived CQI when the derived CQI exceeds a certain threshold as described in the foregoing is applicable to CQI reporting in E-UTRAN. For example, the derived CQI can be scaled by a scaling factor which is a function of the SIR estimated on DL-SCH or on downlink reference signals in an LTE E-UTRAN system.

While the invention has been described in connection with what is presently considered to be the most practical and preferred embodiments, it is to be understood that the invention is not to be limited to the disclosed embodiments, but is intended to cover various modifications within the scope of the appended claims.

The invention claimed is:

1. A method in a user equipment for measuring an instantaneous downlink channel quality indicator (CQI), and reporting a CQI value to the network, comprising:
deriving a true CQI value based upon at least one network controlled parameter and a measured channel quality parameter;
when higher order modulation of 64 QAM and above is used for downlink data transmission, multiplying said true CQI value with a scaling factor to obtain a new CQI value such that the new CQI value will fall within a specified range of CQI values that is different from a range of CQI values prior to the multiplying, wherein the multiplying is used to report the CQI value with the same number of bits when the higher order modulation is used for the downlink data transmission as when the higher order modulation is not used for downlink data transmission; and
reporting the new CQI value as the CQI value if the higher order modulation is used for downlink data transmission.

2. A method according to claim 1, wherein the scaling factor is a function of a signal-to-interference ratio (SIR) measured by the user equipment.

3. A method according to claim 2, wherein the SIR is estimated on HS-PDSCH in a CDMA system.

4. A method according to claim 2, wherein the SIR is estimated on common pilot symbols in a CDMA system.

5. A method according to claim 2, wherein the SIR is estimated on DL-SCH.

6. A method according to claim 2, wherein the SIR is estimated on downlink reference signals.

7. A method according to claim 1, wherein in deriving the true CQI value, the user equipment takes into consideration at least two network signalled power offset values, where the first value is larger than the second one, and performs the multiplying of the derived true CQI value depending upon a comparison of the derived true CQI value with a threshold.

8. A method according to claim 7, wherein the user equipment initially derives the true CQI value using the first power offset value, i.e., the larger value.

9. A method according to claim 8, wherein if the true CQI value derived using the first power offset is smaller than the threshold then the user equipment performs the multiplying of the true CQI value derived using the first value of the power offset, otherwise the true CQI value is derived using the second value of the power offset.

10. A method according to claim 1, wherein the higher order modulation is 64 QAM.

11. A method according to claim 1, wherein said scaling factor is a function of a second channel quality parameter measured by the user equipment.

12. A method as claimed in claim 11, wherein the second channel quality parameter is the same as the measured channel quality parameter.

13. A system, comprising:
a user equipment configured to communicate with a radio base station in a wireless telecommunications network, further configured to measure an instantaneous downlink channel quality indicator, and further configured to report a CQI value to the network using a method including:
deriving a true CQI value based upon at least one network controlled parameter and the measured channel quality indicator;
when higher order modulation of 64 QAM and above is used for downlink data transmission, multiplying said true CQI value with a scaling factor to obtain a new CQI value such that the new CQI value will fall within a specified range of CQI values that is different from a range of CQI values prior to the multiplying, wherein the multiplying is used to report the CQI value with the same number of bits when the higher order modulation is used for the downlink data transmission as when the higher order modulation is not used for downlink data transmission; and
reporting the new CQI value as the CQI value if the higher order modulation is used for downlink data transmission.

14. A method in a base station, the method comprising:
receiving a downlink channel quality indicator (CQI) value from a user equipment; and using the received CQI value for transmitting data, wherein the received CQI value is a result of multiplying a true CQI value derived based upon at least one network controlled parameter and a measured channel quality parameter, with a scaling factor, when higher order modulation of 64 QAM and above is used for downlink data transmission, the multiplying making the received CQI value to fall within a specified range of CQI values that is different from a range of CQI values prior to the multiplying, wherein the multiplying is used so that the received CQI value to have the same number of bits when the higher order modulation is used for the downlink data transmission as when the higher order modulation is not used for downlink data transmission.

15. A system, comprising:
a radio base station configured to communicate with a plurality of user equipments, and a radio network controller of a wireless telecommunications network, further configured to receive a downlink channel quality indicator from at least one of the user equipments, and further configured to interpret the received CQI value as being a result of multiplying a true CQI value derived based upon at least one network controlled parameter and a measured channel quality parameter, with a scaling factor, when higher order modulation of 64 QAM and above is used for downlink data transmission,
wherein the multiplying makes the received CQI value to fall within a specified range of CQI values that is different from a range of CQI values prior to the multiplying, wherein the multiplying is used to make the received CQI value to have the same number of bits when the higher order modulation is used for the downlink data transmission as when the higher order modulation is not used for downlink data transmission.

16. A user equipment, comprising:
an interface configured to enable communication with a base station in a wireless telecommunication network; and
a data processing unit connected to the interface and configured to report a measured channel quality indicator to the base station via the interface, using a method including:
deriving a true CQI value based upon at least one network controlled parameter and a measured channel quality indicator;
when higher order modulation of 64 QAM and above is used for downlink data transmission, multiplying said true CQI value with a scaling factor to obtain a new CQI value such that the new CQI value will fall within a specified range of CQI values that is different from a range of CQI values prior to the multiplying, wherein the multiplying is used to report the CQI value with the same number of bits when the higher order modulation is used for the downlink data transmission as when the higher order modulation is not used for downlink data transmission; and
reporting the new CQI value as the CQI value if the higher order modulation is used for downlink data transmission.

* * * * *

UNITED STATES PATENT AND TRADEMARK OFFICE
CERTIFICATE OF CORRECTION

PATENT NO. : 8,428,017 B2  
APPLICATION NO. : 12/520583  
DATED : April 23, 2013  
INVENTOR(S) : Hu et al.

Page 1 of 1

It is certified that error appears in the above-identified patent and that said Letters Patent is hereby corrected as shown below:

In the Specification

In Column 5, Line 56, delete "$SIR_{HS\text{-}PDSCH}=SIR_{SPICH}+\Gamma+\Delta$ in dB" and insert -- $SIR_{HS\text{-}PDSCH}=SIR_{CPICH}+\Gamma+\Delta$ in dB --, therefor.

Signed and Sealed this  
Eleventh Day of February, 2014

Michelle K. Lee  
*Deputy Director of the United States Patent and Trademark Office*